W. B. UPDEGRAFF.
ELECTRIC APPARATUS FOR MEASURING AND INDICATING SIZES OF TILES, &c.
APPLICATION FILED JUNE 17, 1910.
980,851. Patented Jan. 3, 1911.
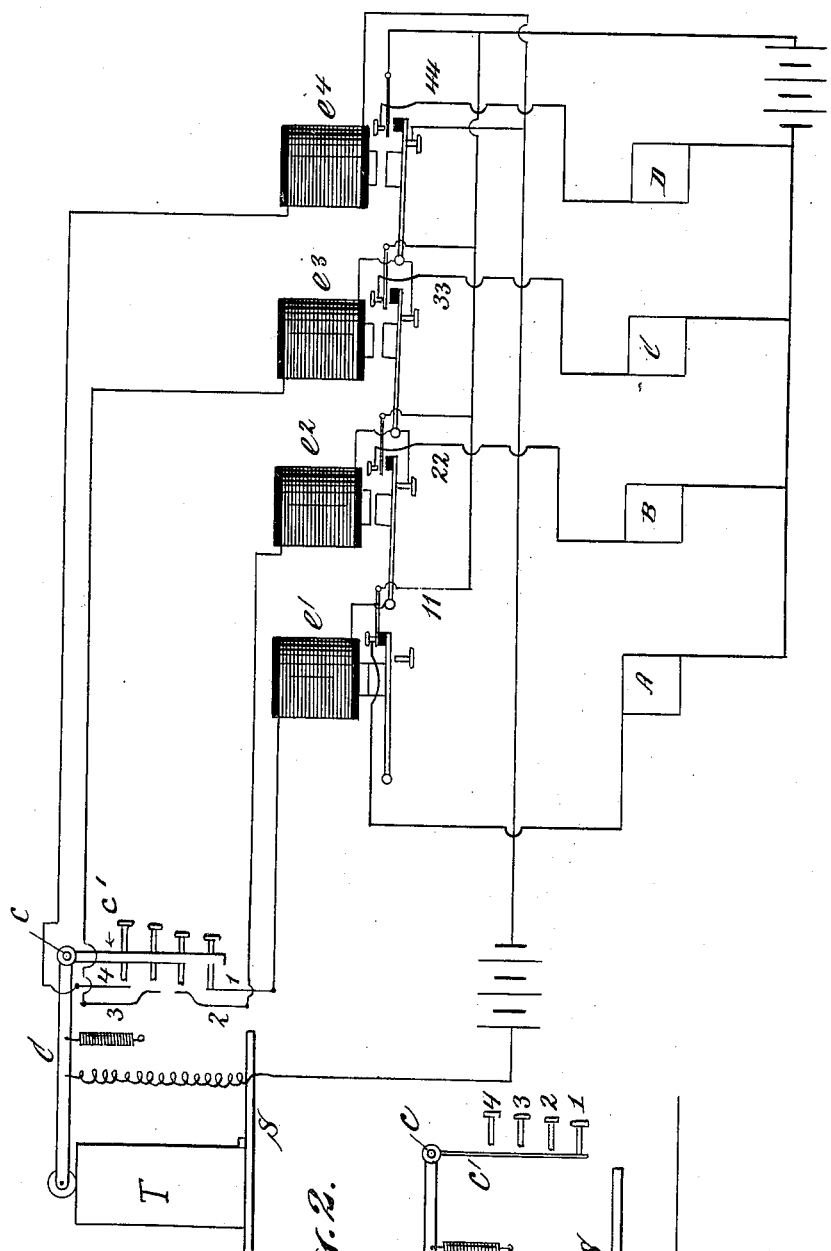
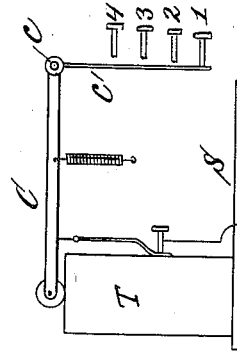

UNITED STATES PATENT OFFICE.

WILLIAM B. UPDEGRAFF, OF NEW YORK, N. Y.

ELECTRIC APPARATUS FOR MEASURING AND INDICATING SIZES OF TILES, &c.

980,851. Specification of Letters Patent. Patented Jan. 3, 1911.

Application filed June 17, 1910. Serial No. 567,350.

*To all whom it may concern:*

Be it known that I, WILLIAM B. UPDEGRAFF, a citizen of the United States, residing in the borough of Manhattan, city, county, and State of New York, have invented certain new and useful Improvements in Electric Apparatus for Measuring and Indicating Sizes of Tiles, &c., of which the following is a specification.

My invention is designed to afford a simple and effective method of detecting and indicating variations in size of tile and other similar articles, in such manner that they may be conveniently sorted, marked or otherwise designated or classified, for use, substantially as hereinafter set forth.

The invention consists primarily in the use of a combined feeler and circuit closer adapted to make contact consecutively with a series of electric terminals each corresponding to a prescribed dimension of the article to be measured; and secondarily, in the use of electromagnetic means whereby only the last circuit closed in the series is actuated to indicate the measurement attained, substantially as hereinafter more fully set forth.

For various reasons well known in the art, tiles vary in dimensions when finished. Even when compressed in molds of exactly the same dimensions these variations occur by reason of difference in density, pressure and shrinkage during firing, to such an extent that sorting according to size is essential before use. Heretofore, the sorting has been done by hand with the aid of gage plates, but this method is slow and inaccurate. As ordinarily used, tiles are arranged in parallel rows, the shorter edges abutting each other midway of the length of adjacent tiles, hence variations in length will cause the tiles to "creep" or crowd in one direction or the other as related to the rows of tiles previously laid, thus preventing the perfect alinement of the medial or cross joints and marring the symmetrical effect which is so desirable, if not absolutely essential under ordinary conditions of use. The shrinkage due to firing takes place in all directions,—that is, it is shrinkage of volume and affects the length, width and thickness of the tile; but as the shrinkage is in proportion to the dimensions, it follows that by gaging one dimension all dimensions are necessarily gaged. Therefore by gaging the longest dimension, I not only gage the area of the face of the tile, but utilize the direction of greatest possible variation for the purpose of indicating the size of the tile,—a matter of practical importance when variations of 1/32 or less of an inch are to be detected and recorded.

Figure 1, in the accompanying drawing shows diagrammatically the essential features of my invention and illustrates the practical application of the system to the measurement of tile, although I do not limit myself to this particular use since it is obvious that other articles of manufacture may be so measured and their dimensions indicated. Fig. 2, shows a modification of the feeler and circuit closer and the terminal contacts.

The tile T to be measured is placed upon a support S, having a prescribed relation to the combined feeler and circuit closer C. The latter may be made in the form of a rock lever pivotally supported at $c$, although this is not an essential feature, since any mechanical expedient may be resorted to which would be adapted to feel the article to be measured and cause electrical contact consecutively with a series of circuit terminals, as for instance 1, 2, 3, 4. As shown in Fig. 1, of the drawings the said terminals 1, 2, 3, 4, are elastic and resilient so as to yield successively as the circuit closing arm $c'$, is advanced, whereas in Fig. 2, the circuit closing arm $c'$, is itself resilient and yields to the fixed terminals 1, 2, 3, 4. In either case the result is the same in that the contacts are successively made,—the minimum measurement causing contact with terminal 1 in the arrangement shown in Fig. 1 and so on for each dimension, and inversely, the maximum measurement causing contact with the terminal 1 in the arrangement shown in Fig. 2, and so on for each dimension. The combined feeler and circuit closer may be in permanent electrical connection, as shown in Fig. 1, or be thrown into electrical connection by the tile or other article as shown in Fig. 2.

Interposed in each primary circuit is an electric device $e'$, $e^2$, $e^3$, $e^4$, for indicating a measurement, either directly or indirectly, as may be found most expedient. Thus instead of the electromagnets shown, $e'$, $e^2$, $e^3$, $e^4$, other electric indicators may be substituted; or the electromagnets may be utilized to close secondary circuits 11, 22, 33, 44, in which are interposed electric appliances A, B, C, D, of any desired character.

In the arrangement of primary and secondary circuits shown in Fig. 1, the last contact made by the feeler and circuit closer will control as affording the line of least resistance, the preceding contacts being cut out by open circuit,—it being understood as aforesaid that the terminals are so arranged that the one representing the minimum dimension is first contacted, as in Fig. 1, and so on consecutively to the terminal representing the maximum dimension, or vice versa, as in Fig. 2, which ever arrangement may be found most expedient. In this connection it may be stated that any desired number of sub-divisions or measurements between minimum and maximum may be provided for, the four shown in the drawings being by way of illustrating the principle only.

In Fig. 2, the fixed terminals 1, 2, 3, 4, are substituted for the flexible terminals 1, 2, 3, 4, of Fig. 1, and represent the same primary circuits shown in Fig. 1.

What I claim as my invention and desire to secure by Letters Patent is,

1. Means for measuring the dimensions of tiles &c., comprising a support for the article to be measured, a feeler arranged to contact with the article to be measured, an electric circuit closer actuated by said feeler, a plurality of primary electric circuits controlled by said feeler and circuit closer, an electromagnetic switch in each of said primary circuits, secondary electrical circuits controlled by said electromagnetic switches, and an electrical indicating device interposed in each of said secondary circuits, for the purpose described.

2. Means for detecting and indicating variations in dimension of tile comprising a support for tile, a feeler arranged to contact with an edge of said tile, an electric circuit closer actuated by said feeler, a plurality of electric circuits controlled by said circuit closer each having a terminal arranged to contact with the circuit closer at a point different from the others and corresponding to a certain prescribed dimension of tile, and electrically actuated indicating means controlled by said electrical circuits for the purpose set forth.

WILLIAM B. UPDEGRAFF.

Witnesses:
D. W. GARDNER,
GEO. WM. MIATT.